(12) United States Patent
Sheem

(10) Patent No.: US 6,597,820 B1
(45) Date of Patent: Jul. 22, 2003

(54) LOW-COST FIBER OPTIC PRESSURE SENSOR

(75) Inventor: Sang K. Sheem, Pleasanton, CA (US)

(73) Assignee: The Regents of the University of California, Oakland, CA (US)

( * ) Notice: Subject to any disclaimer, the term of this patent is extended or adjusted under 35 U.S.C. 154(b) by 873 days.

(21) Appl. No.: 08/935,368

(22) Filed: Sep. 22, 1997

(51) Int. Cl.$^7$ .................................................. G02B 6/00
(52) U.S. Cl. .............................. 385/12; 385/13; 385/33
(58) Field of Search ........................... 385/12, 13, 31, 385/33; 264/1.24, 1.25

(56) References Cited

U.S. PATENT DOCUMENTS

| | | | |
|---|---|---|---|
| 3,814,081 A | * 6/1974 | Mori | 385/12 |
| 4,787,396 A | 11/1988 | Pidorenko | 128/667 |
| 4,856,317 A | 8/1989 | Pidorenko et al. | 73/4 R |
| 5,279,793 A | * 1/1994 | Glass | 385/13 |
| 5,280,173 A | * 1/1994 | Morse et al. | 385/12 |
| 5,452,087 A | 9/1995 | Taylor et al. | 356/352 |
| 5,822,072 A | * 10/1998 | Dai et al. | 385/12 |

* cited by examiner

Primary Examiner—Ellen E. Kim
(74) Attorney, Agent, or Firm—John P. Wooldridge; Alan H. Thompson

(57) ABSTRACT

The size and cost of fabricating fiber optic pressure sensors is reduced by fabricating the membrane of the sensor in a non-planar shape. The design of the sensors may be made in such a way that the non-planar membrane becomes a part of an air-tight cavity, so as to make the membrane resilient due to the air-cushion effect of the air-tight cavity. Such non-planar membranes are easier to make and attach.

8 Claims, 4 Drawing Sheets

LOW-COST FIBER OPTIC PRESSURE SENSOR

The United States Government has rights in this invention pursuant to Contract No. W-7405-ENG-48 between the United States Department of Energy and the University of California for the operation of Lawrence Livermore National Laboratory.

BACKGROUND OF THE INVENTION

1. Field of the Invention

The present invention relates fiber optic pressure sensors, and more specifically, it relates to methods for reducing the size of fiber optic pressure sensors.

2. Description of Related Art

Optical fibers have been used widely for sensing various physical or chemical entities. In many applications optical fiber is used because it is very thin, being typically 125 $\mu$m (0.125 mm). One example is an engine cylinder pressure sensor to be embedded in a spark plug. In such an application, the diameter of the whole sensor should be less than 1 mm. A typical sensor for such an application consists of a tubing with a planar membrane attached at the end and an optical fiber inserted inside. A light from an optical fiber impinges on the membrane and a part of the light is reflected (either by a simple reflection or by an interferometric effect) from the membrane and is coupled back into the fiber and/or other fibers. One major fabrication difficulty in this sensor type is the attachment of the membrane to the end of the small tubing. When the tubing size becomes very small such an operation becomes impossible. Even when attachment can be done, the production cost becomes higher as the size gets smaller. These problems have hindered the wider application of optical fiber sensors.

Among many advantages of using optical fibers for sensors, one distinct advantage is the thinness of its diameter. An optical fiber is typically made of fused quartz, and its typical outer diameter (OD) is 125 $\mu$m (=0.125 mm). The OD may be reduced even further to 60 $\mu$m or even to 20 $\mu$m since the light-guiding core is 50 $\mu$m for the commonly-used multimode fiber, and less than 9 $\mu$m for the most commonly-used fibers, namely single-mode fibers. Accordingly, there are a variety of applications where a long and thin fiber strand is inserted into a location that is otherwise inaccessible, to measure some physical or chemical entity. One sensor configuration is depicted in a highly schematic fashion in FIG. 1, in which an optical fiber 1 is inserted into a thin tubing 2 that is terminated by a planar membrane 3. FIG. 2 shows the sectional view of the embodiment of FIG. 1. Even though FIG. 1 shows only one strand of optical fiber, it is to be understood throughout this invention disclosure that there can be more than one fiber involved, such as a bundle of fibers. This understanding does not alter the validity and generality of the present invention.

The sensing mechanisms can vary. In some cases, the membrane 3 may be exposed to a certain gas or liquid that produces a fluorescence light emission. The fiber 1 would collect the emission and the wavelength content of the collected light provides information on the nature of the gas or liquid: identification, concentration and/or temperature. In other cases, the membrane may be deflected by an external stimuli, such as acoustic wave, gas pressure, liquid pressure, or physical pressure. The deflection may be detected by first sending light through the fiber 1 and then directing the light returning through the fiber or fibers 1 onto a detector. One common physical mechanism to induce change in the amount of the returned light is Fabry-Perot interferometry. The other is by amplitude modulation. The present invention works with any of these mechanisms, and thus the particularly of the sensing mechanism or sensing entities is not the subject of this invention. With this point understood, the present invention will be described using one simple sensing mechanism, namely the amplitude modulation. FIG. 3 shows a fiber 1 with the core 5 terminated near the membrane 3 (FIG. 3 is actually a close-up view of FIG. 2 near the fiber end). The light impinges on the membrane 3 and is reflected. In this process, only a part of the light 6 is coupled back to the core 5. There could be fibers, other than the input fiber 1, for collecting the reflected light so that the fiber 1 is used only for transmitting the light 6 to the membrane 3. This is for instrumentation convenience. Now, referring to FIG. 4, if the membrane 3 is deflected, the pattern of the light reflection is altered, and the amount of the light 6 being coupled back into the fiber 1 changes. The amount of the change indicates the amount of the deflection. (In an interferometric sensor, the change in the gap modulates the light reflection; a change by one-quarter wavelength causes a full swing between the maximum and the minimum in the reflected light power. In this case, only one fiber 1 is used for sending and collecting the light 6.)

The market size of fiber optic sensors is very large, exceeding a few hundreds of millions of dollars today, and it is still expanding rapidly. One technical stumbling block is the fabrication. When the size of the tubing becomes smaller than about 1 mm, it becomes more difficult to attach the membrane 3 at the end of the tubing 2. And there are many applications in which small size is essential.

SUMMARY OF THE INVENTION

It is an object of the invention to make to reduce the size of fiber optic pressure sensors.

It is another object of the invention to reduce the cost of fabricating small-size fiber optic pressure sensors.

The difficulty in reducing the size of fiber optic pressure sensors is mainly related to the requirement that the membrane should be smooth and taut. The smoothness is required for satisfactory light reflection, and the tautness is required for reproducibility, quick response, and also satisfactory reflection. This difficulty can be lessened substantially if the membrane is designed to have a non-planar surface in its natural state (in the absence of a stimulus such as a pressure), such as spherical, conical or wedge shape. Then some of the conventional fabrication methods such as extrusion and forming can be mobilized much more readily for the sensor fabrication.

It may be necessary in some applications (when the membrane material is too thin or too flexible) to transform the area under a non-planar membrane into a cavity using a plugging material, so as to make the enclosed space air-tight. Then the non-planar membrane can keep its shape and remain taut like a balloon surface as the surface becomes resilient due to the air-cushion effect of the air-tight cavity.

As an example of fabrication methods, one can literally blow a balloon, in which a molten or liquid state material is blown by a pressure applied to the other end of the tubing until it forms a semi-sphere. The extra amount of the molten or liquid state material will be blown out of the tubing, leaving behind a thin balloon-like membrane. The material 12 is then solidified, either (i) thermally using a heater, (ii) as the molten material cools down, or (iii) by polymerization by ultra-violet (UV) exposure if it is a UV-curable polymer.

Liquid rubber material called RTV, which solidifies by itself over a time period, is another excellent raw material for making the novel membrane. A low melting-temperature glass may be blown into the sphere inside a high-melting temperature tubing such as quartz or tungsten. The spherical nature of the surface does not have to be pronounced. So long as the surface is even slightly convex, it will be much easier to fabricate the membrane following the teaching described here.

Another embodiment with a great potential uses a small ball that is made separately and then inserted inside the tubing, or attached to the tubing. There are conventional fabrication methods for making miniature size spheres or balls, and fiber optic sensors can utilize such spheres. The surface of the ball that is exposed outside the tubing will work as the membrane. In many applications, the membrane should be thin. However, there are other applications in which the stimulus is very powerful. An example is the engine cylinder pressure sensor. The pressure can reach about 1,000 psi. In such applications the ball 16 should be solid.

DETAILED DESCRIPTION OF THE INVENTION

Figure 1:
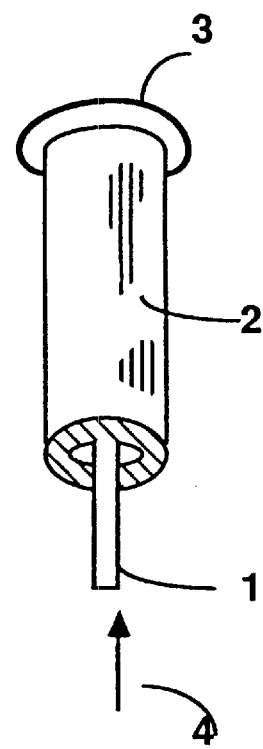
FIG. 1 shows a schematic of a conventional fiber optic sensor comprising an optical fiber, a tubing, and a planar membrane.
Figure 2:
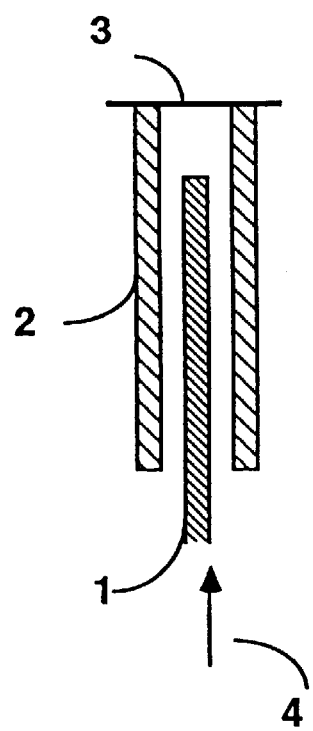
FIG. 2 shows a sectional view of the sensor in FIG. 1.
Figure 3:
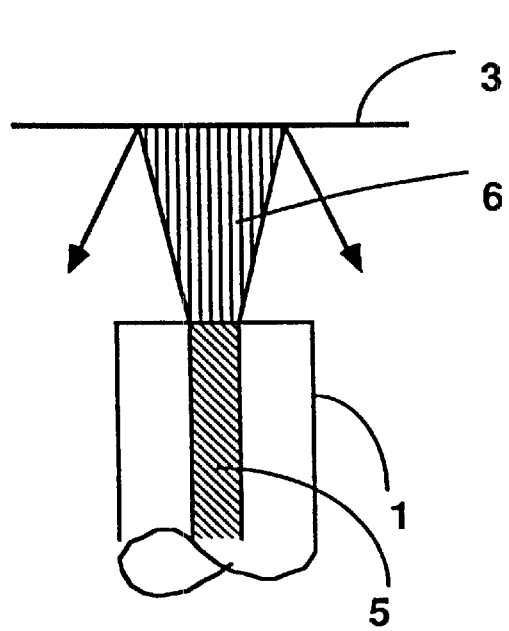
FIG. 3 shows a close-up view of the sensor of FIG. 2, depicting that light from the fiber end facet is reflected from the membrane.
Figure 4:
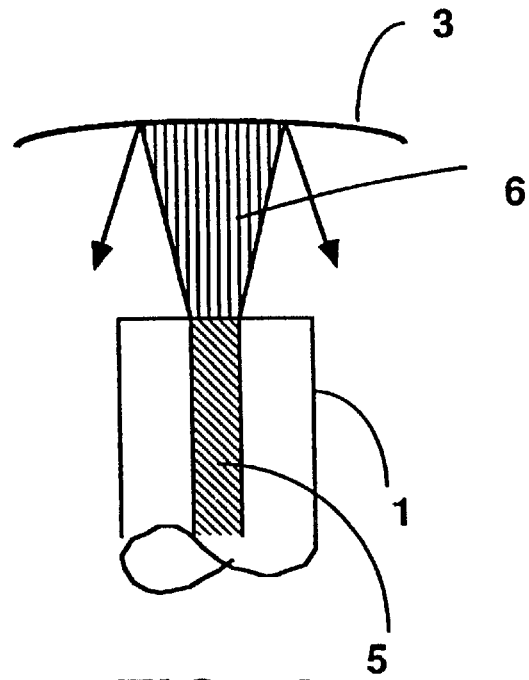
FIG. 4 shows a close-up view of the sensor of FIG. 2, except that the membrane is deflected by an external stimulus.
Figure 5:
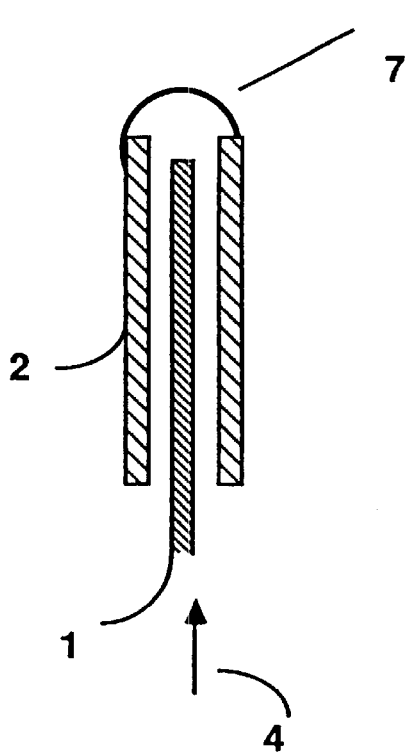
FIG. 5 shows one embodiment of the present invention, in which the membrane has a spherical shape.
Figure 6:
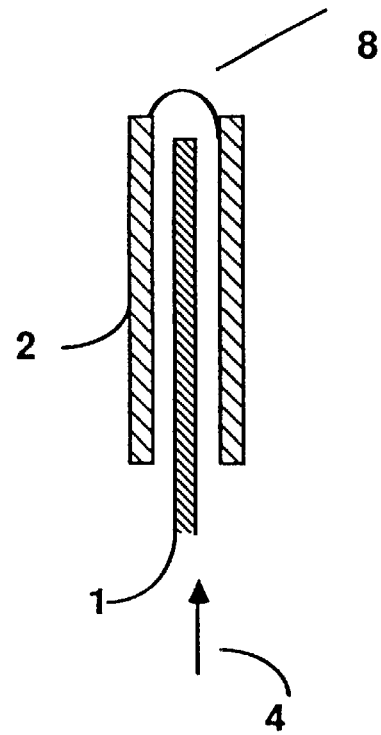
FIG. 6 shows another embodiment of the present invention, where the base of the spherical membrane is confined within the inner diameter of the tubing.
Figure 7:
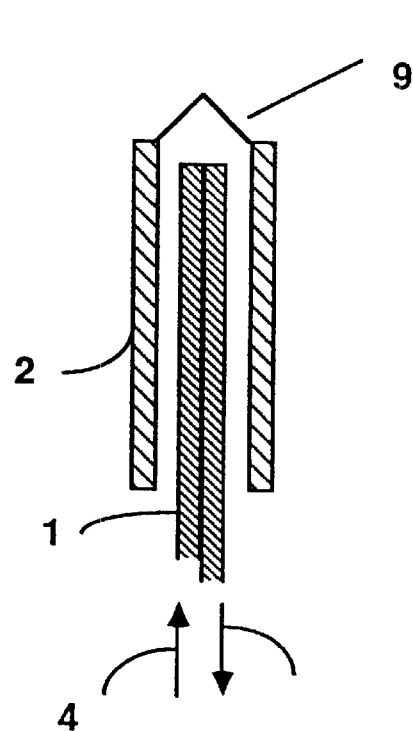
FIG. 7 shows another embodiment of the present invention, in which the membrane has a conical or wedge shape.

The objective of the present invention is to make it possible to reduce the size beyond what is possible today, and also reduce the cost of fabricating small-size fiber optic sensors. The difficulty is mainly related to the requirement that the membrane 3 should be smooth and taut. The smoothness is required for satisfactory light reflection, and the tautness is required for reproducibility, quick response, and also satisfactory reflection. When the tubing size becomes very small, the membrane thickness should become thinner as well, so that the flexibility of the membrane remains the same. When the tubing size shrinks below 1 mm, it becomes more expensive or even impossible to make a thin membrane, cut into the right size, and attach it to the end of the tubing while keeping it smooth and taut. This difficulty can be lessened substantially if we allow the membrane to have a non-planar surface in its natural state (in the absence of a stimulus such as a pressure), such as spherical 7 and 8, conical or wedge shape 9, as depicted in FIGS. 5 through 7. Then some of the conventional fabrication methods such as extrusion and forming can be mobilized much more readily for the sensor fabrication.

Figure 8:
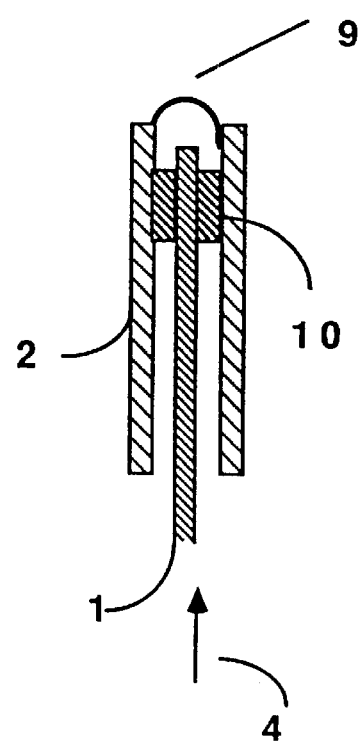
FIG. 8 shows another embodiment of the invention having an inner space of the tubing near the spherical membrane that is sealed to make the space air-tight.

It may be necessary in some applications (when the membrane material is too thin or too flexible) to transform the area under a non-planar membrane, 7, 8, or 9, into a cavity using a plugging material 10, so as to make the enclosed space air-tight, as depicted in FIG. 8. FIG. 8 shows the use of a spherical membrane. Then the non-planar membrane can keep its shape and remain taut like a balloon surface as the surface becomes resilient due to the air-cushion effect of the air-tight cavity.

Figure 9C:
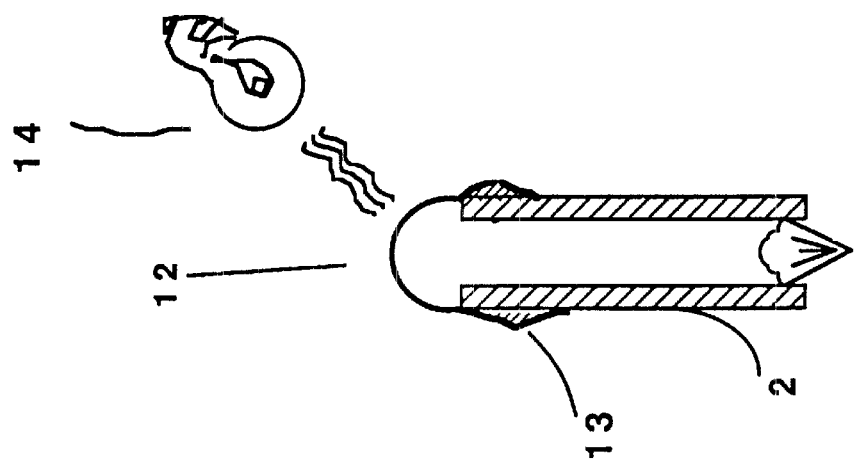
FIGS. 9A–C illustrate one simple method for making the spherical membrane, in which (9A) a liquid or molten material is blown to a semisphere (9B), and then solidified (9C).
Figure 9B:
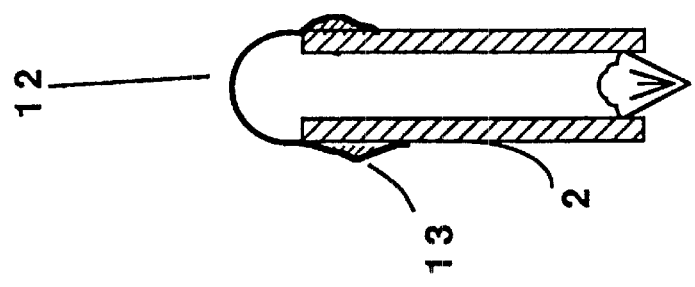
Figure 9A:
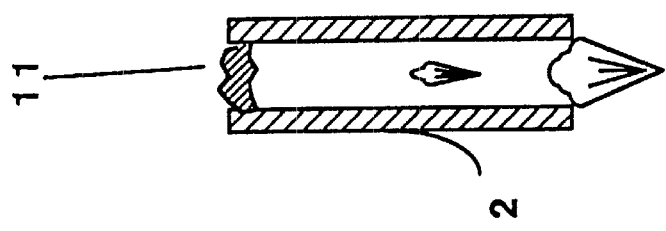

As an example of fabrication methods, one can literally blow a balloon, as depicted in FIG. 9 over three fabrication steps (A), (B), and (C), in which a molten or liquid state material 11 is blown by a pressure applied to the other end of the tubing until it forms a semi-sphere. The extra amount of the molten or liquid state material 13 will be blown out of the tubing, leaving behind a thin balloon-like membrane 12 as shown in (B). The material 12 is then solidified, either (i) thermally using a heater 14, (ii) as the molten material cools down, or (iii) by polymerization by ultra-violet (UV) exposure if it is a UV-curable polymer. Liquid rubber material called RTV, which solidifies by itself over a time period, is another excellent raw material 11 for making the novel membrane 12 following the procedure shown in FIGS. 9A–C. A low melting-temperature glass 11 may be blown into the sphere 12 inside a high-melting temperature tubing 2 such as quartz or tungsten. The spherical nature of the surface 12 does not have to be as pronounced as sketched in FIGS. 9A–C. So long as the surface is even slightly convex, it will be much easier to fabricate the membrane following the teaching described here.

In the present invention, the both of fabrication and attachment of membranes are accomplished in one step. Thus the fabrication cost will be substantially lower, especially when the tubing size and the membrane thickness are very small. In some applications, the present invention may be the only way to make a fiber optic sensor.

It is worthwhile to note that, even though the membrane is shown to be attached at the end of a tubing throughout the invention disclosure here, it is conceivable that the membrane may be attached onto a hole located anywhere else, such as on the side wall of a tubing. In other words, the teaching may be practiced in embodiments different from the particular ones shown above, which are provided for the purpose of illustration.

Figures 10, 11:
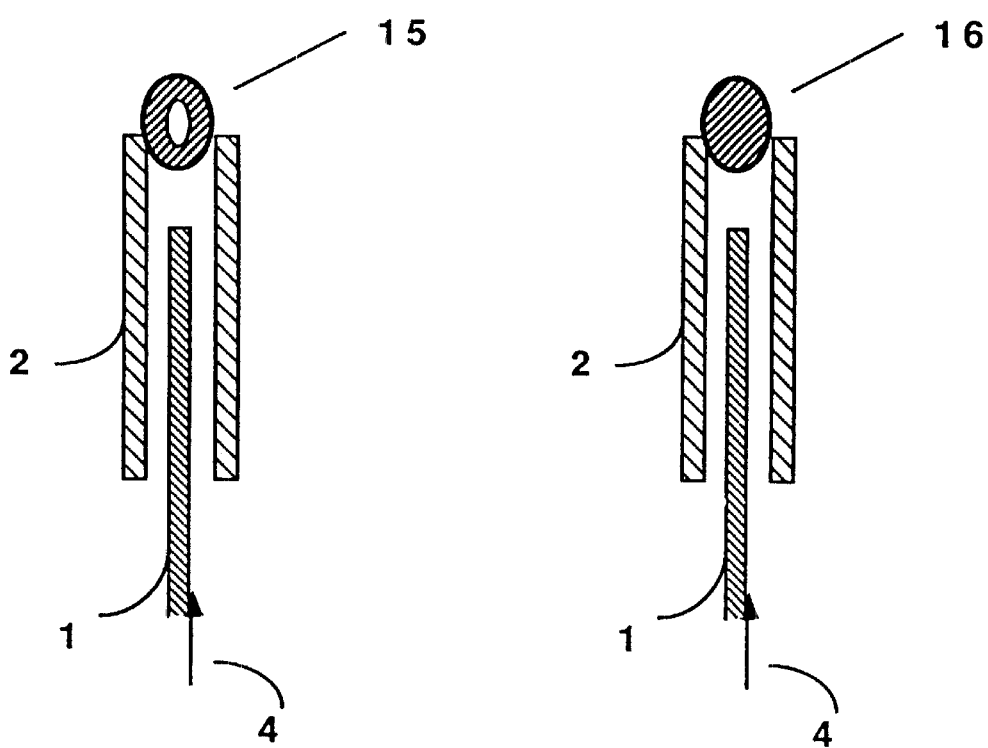
FIG. 10 shows the surface of the ball exposed outside the tubing for use as the membrane.
FIG. 11 shows the ball of FIG. 10 as a solid.

Another embodiment with a great potential is shown in FIG. 10, in which a small ball 15 is made separately and then inserted inside the tubing 2, or attached to the tubing 2. There are conventional fabrication methods for making miniature size spheres or balls, and fiber optic sensors can utilize such spheres. In FIG. 10, the surface of the ball 15 that is exposed outside the tubing 2 will work as the membrane. In many applications, the membrane should be thin. However, there are other applications in which the stimulus is very powerful. An example is the engine cylinder pressure sensor. The pressure can reach about 1,000 psi. In such applications, as depicted in FIG. 11, the ball 16 should be solid.

Obviously many modifications and variations of the present invention are possible in light of the above teachings. It is therefore to be understood that within the scope of the appended claims the invention may be practiced otherwise than as specifically described.

What is claimed is:

1. An optical fiber sensor comprising:

a tubing, an optical fiber residing inside the tubing, and a membrane attached to the tubing; and a plugging material located between said optical fiber and said tubing, wherein an air-tight cavity is formed by said plugging material in combination with said tubing and said optical fiber and said membrane, whereby the surface of said membrane becomes resilient due to the air-cushion effect of said air-tight cavity;

wherein the surface of the membrane is non-planar, smooth, and taut.

2. The optical fiber sensor of claim 1, wherein the surface of the membrane is convex as viewed from outside of the tubing.

3. The optical fiber sensor of claim 1, wherein the surface of the membrane is spherical.

4. The optical fiber sensor of claim 1, wherein the surface of the membrane is conical.

5. The optical fiber sensor of claim 1, wherein the surface of the membrane is of a wedge shape.

6. The optical fiber sensor of claim 1, wherein said membrane is made of a partial surface of a whole spherical ball.

7. The optical fiber sensor of claim 6, wherein said spherical ball is solid.

8. The optical fiber sensor of claim 6, wherein said spherical ball is hollow.

* * * * *